March 2, 1965

Z. J. LANSKY ET AL 3,171,439

PILOT OPERATED VALVE

Filed March 7, 1962

2 Sheets-Sheet 1

INVENTORS.
ZDENEK J. LANSKY
BY KURT W. LEIBFRITZ

John N. Wolfram
ATTORNEY

INVENTORS.
ZDENEK J. LANSKY
BY KURT W. LEIBFRITZ

John N. Wolfram
ATTORNEY

United States Patent Office 3,171,439
Patented Mar. 2, 1965

3,171,439
PILOT OPERATED VALVE
Zdenek J. Lansky, Winnetka, and Kurt W. Leibfritz, Norridge, Ill., assignors to Parker-Hannifin Corporation, Cleveland, Ohio, a corporation of Ohio
Filed Mar. 7, 1962, Ser. No. 178,107
10 Claims. (Cl. 137—625.64)

This invention relates to pilot operated valves and more particularly to a valve for controlling the flow of fluid to and from a fluid pressure operated motor.

In general, the present invention includes a valve member which controls flow of motive fluid to and from a fluid motor, the valve member being movable by a fluid pressure operated piston having oppositely facing effective areas, one of the areas being constantly exposed to fluid under pressure to move the piston in one direction when there is no fluid under pressure acting on the other effective area, and there being a solenoid operated pilot valve for controlling the flow of pressure fluid to and from the other effective area to thus cause reciprocation of the piston.

One of the objects of the invention is to provide a valve of this type in which the piston has spaced apart bearing portions of different diameters and the valve member for controlling the fluid motor is attached to the piston intermediate the ends of the same to provide a compact structure without tending to tilt the piston in its bearing support.

Another object is to provide a valve of this type in which the parts are easy to machine and to assemble.

Another object is to provide a valve in which external piping between the main valve housing and the pilot valve housing is eliminated.

Another object is to provide a valve of the type described in which the housing for the main valve is symmetrically machined with bore portions of like diameter wherein a closure plug for one end of the bore and a pilot valve for mounting at the other end of the bore can be interchanged as desired.

Figure 1:
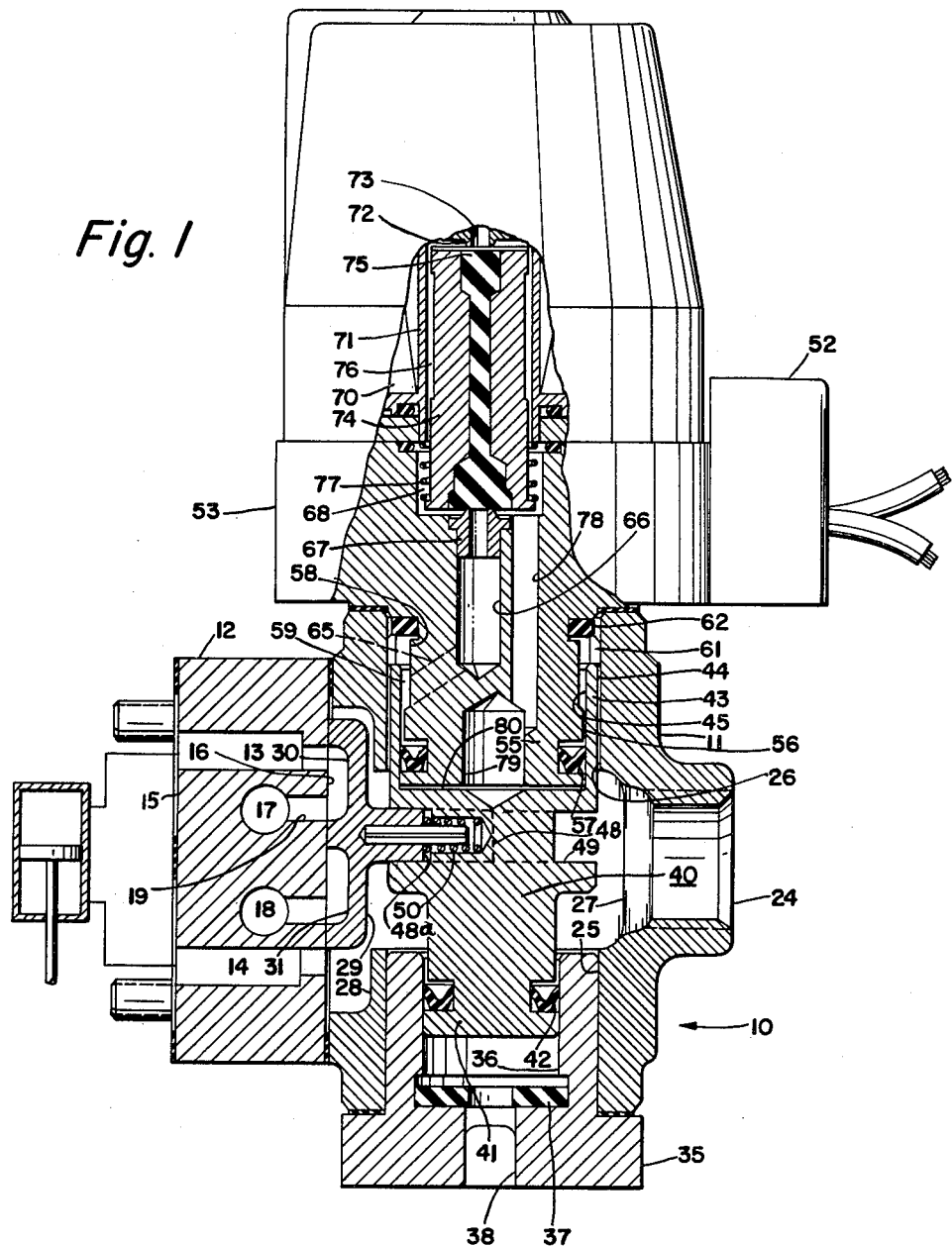
Figure 2:
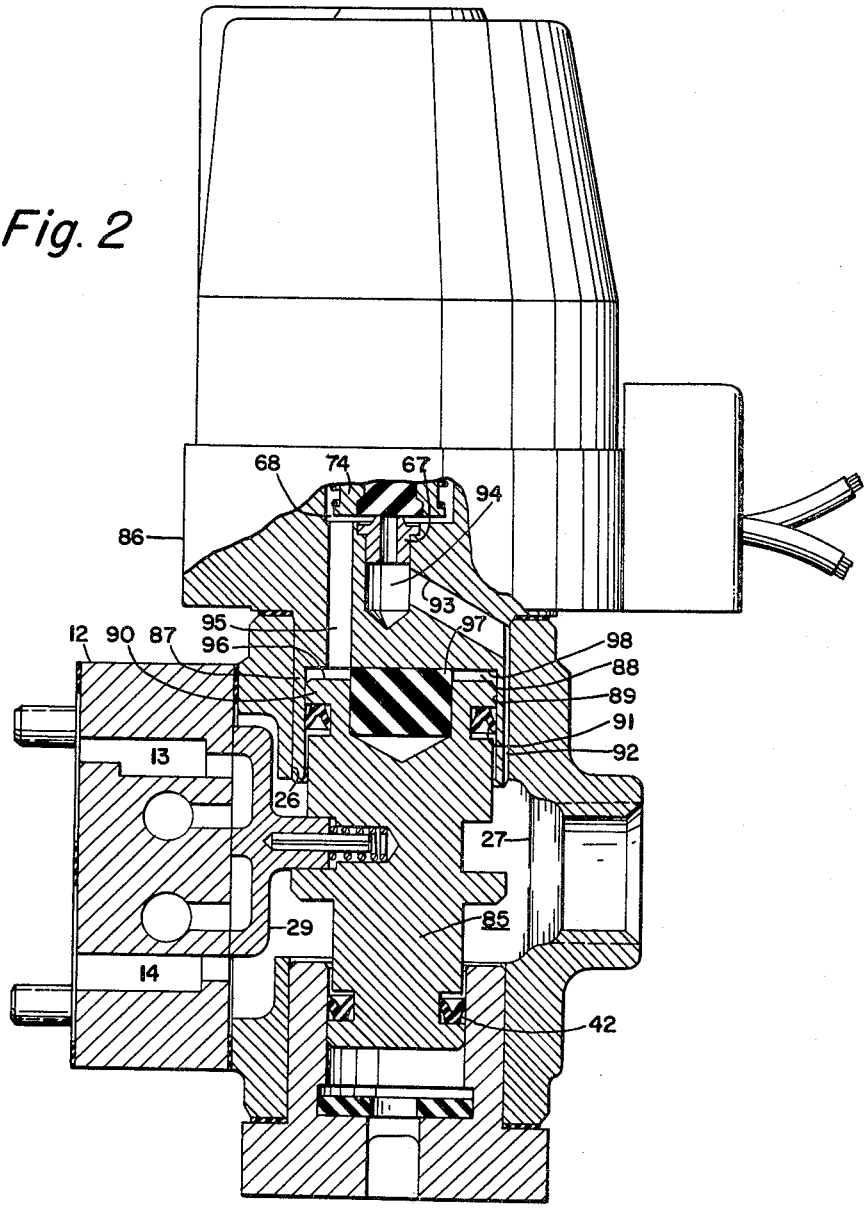

Other objects of the invention will be apparent from the following description and from the drawings in which:

FIG. 1 is a vertical cross section view but with only a partial section through the solenoid operated pilot valve portion, and FIG. 2 is a cross section view, but with only a portion of the pilot valve shown, of a modified form of the invention.

The valve includes a main valve housing generally indicated as 10 and including a body 11 and a distributing block 12. Block 12 has a pair of motor ports 13 and 14 extending therethrough from lower face 15 to upper face 16. A pair of exhaust ports 17 and 18 are connected to upper face 16 by ports 19 and 20, respectively. The lower end of port 13 may be connected to one end of a fluid motor and the lower end of port 14 may be connected to the other end of such fluid motor, in the well known manner.

Body 11 has spaced bore portions 25, 26 of like diameter with a fluid passage 27 connected to a fluid inlet port 24 between bore portions 25, 26. The lower end of passage 27 is enlarged as at 28 to form a valve chamber in which a valve member 29 is mounted. The valve member has recesses 30, 31, recess 30 connecting motor port 13 with exhaust passage 19 in one position of the valve member and recess 31 connects motor port 14 with exhaust passage 20 in another position of the valve member. In the first of these positions, cylinder port 14 is open to pressure passage 27 and in the other of these positions motor port 13 is open to pressure passage 27.

Mounted in bore portion 25 is a closure plug 35 which has a smaller bore 36 which at its bottom has a rubber washer 37. The latter has a central opening for connecting the interior of bore 36 with a vent opening 38 in plug 35.

Mounted within body 11 is a piston 40 having a small diameter end 41 receivable with a sliding fit within bore 36 and sealed with respect thereto by packing 42. The other end 43 of the piston is larger in diameter so as to be received with a small clearance 44 within bore portion 26. This large end 43 is recessed as at 45.

Valve member 29 has a central projection 48 of rectangular cross section with a semi-circular cutout 48a therein extending into an annular groove 49 formed in piston 40 between small diameter end 41 and large diameter end 43. A spring 50 presses valve element 29 tightly against valve block face 16.

Mounted on body 11 is a solenoid operated pilot valve generally designated 52 and which includes a pilot valve housing 53. Housing 53 has a cylindrical portion 55 which projects into recess 45 within large end portion 43 of the piston and toward its lower end has a snug sliding fit therewith as at 56 which is sealed by a packing 57. The upper end of cylindrical portion 55 is formed with a smaller diameter as at 58 to provide an annular space 59 between the cylindrical extension and the inner wall of recess 45. The upper end of piston portion 43 is slotted so as to form radial openings 61 therein, such upper end abutting the resilient member 62 at one end of the piston travel.

Cylindrical portion 55 has a drilled passage 65 which connects annular space 59 with a central passage 66 in which is mounted a pilot valve seat member 67 which opens into an armature chamber 68. Pilot valve 52 includes a solenoid coil 70, a hollow bobbin 71 whose interior is open to chamber 68, and an upper seat 72 having a passage 73 therethrough which leads to atmosphere. Mounted within bobbin 71 is an armature 74 having a resilient member 75 extending therethrough. The armature has a clearance 76 with the interior of the bobbin 71 and is normally held in a lower position by spring 77 to close off lower valve seat 67 with upper valve seat 72 remaining open. A passage 78 connects chamber 68 with an opening 79 which leads to bottom wall 80 of recess 45.

In operation fluid under pressure is introduced to body 11 through inlet port 24. With solenoid 70 de-energized and with the parts in the position as shown, fluid under pressure from inlet 24 passes through passage 27 and valve chamber 28 to cylinder port 14 and then to one end of the fluid motor to which the valve may be attached. At the same time, fluid under pressure from passage 27 passes through clearance 44 and slots 61 into annular clearance 59, from where it passes through passages 65 and 66 but is stopped at valve seat 67 by virtue of the latter being closed by armature 74. At the same time, fluid from annular clearance 59 is prevented from reaching recess bottom 80 by packing 57.

At this time, fluid pressure in passage 27 is acting upon a first effective area on piston 40 in an upward direction, such first effective area being determined by the difference in the outer diameters of packings 42 and 57. This maintains piston 40 and valve member 29 in the upward position as shown. Also at this time the bottom of recess 45 is exhausted to atmosphere through opening 79, passage 78, chamber 68, clearance 76, and open valve seat 72 through passage 73.

When the fluid motor reaches the end of its stroke solenoid 70 will be caused to be energized by a means not here shown. This raises armature 74 to close off seat 72 and to open seat 67. This permits pressure fluid to flow from passage 66 through valve seat 67 into chamber 68 to passage 78 and opening 79 to bottom wall 80 of recess 45. Bottom wall 80 thus becomes a second effective area and pressure thereon overcomes the upward force of fluid acting on piston 40 and causes it to move downwardly until the smaller end 41 of the piston comes to a cushioned stop against resilient washer 37.

The piston carries valve member 29 downward to a position where recess 31 connects motor port 14 with exhaust port 18 and motor port 13 is open to chamber 28 and hence fluid pressure passage 27. This causes the fluid motor to reverse its stroke and when the return stroke is completed solenoid 70 is de-energized by a means not here shown. Upon such de-energization, spring 77 returns armature 74 to the position where it closes off seat 67 and opens seat 72. This cuts off the supply of pressure fluid from passage 66 through passages 78 and 79 to piston recess bottom wall 80 and causes venting of the pressure fluid from wall 80 through opening 79, passage 78, chamber 68, clearance 76, seat 72, and passage 73 as previously described. Such venting then permits pressure in passage 27 acting upwardly on the first effective area of piston 40 to move the same and valve 29 to their upper positions, as shown. Packing 57 is of conventional lip type which seals in only one direction and therefore permits flow of fluid therepast from recess 45 through sliding fit 56 to prevent excess build up of pressure within the recess when fluid is otherwise trapped therein by closing of the pilot valve.

The modification shown in FIG. 2 is the same as the form shown in FIG. 1 except for the upper end of piston 85 and the lower end of solenoid valve housing 86. In this case, housing 86 has a cylindrical portion 87 which is a close fit within main valve housing bore 26 and has a recess 88 whose inner wall 89 is a close sliding fit with the upper end portion 90 of piston 85, this fit being sealed by packing 91. A slot 92 in the outer face of cylindrical portion 87 connects passage 27 with passage 93 and passage 94 in which is mounted pilot valve seat 67. Another passage 95 connects armature chamber 68 with the bottom of recess 88. Piston 85 has an end face 96 exposed to recess 88 and there is a resilient member 97 carried by piston 85 to serve as a cushioning stop for the piston when the resilient member is in contact with bottom wall 98 of the recess.

In this instance, the first, or upwardly acting effective area on piston 85 is determined by the difference in outside diameters of packings 42 and 91 whereas the second, or downwardly acting effective area on the piston is provided by piston end face 96 and the upper end of resilient member 97.

With the solenoid de-energized, armature 74 is seated against seat 67 by spring pressure to close off supply of pressure fluid to recess 88 from passage 27 through slot 92, passages 93 and 94, armature chamber 68, and passage 95, and to permit exhausting of recess 88 through passage 95, armature chamber 68, clearance 76 and seat 72, the latter two portions not being shown in this figure. This permits the pressure in passage 27 acting upwardly on the first effective area of the piston to maintain the piston and valve 29 in the upper position as shown.

Upon energization of the solenoid as previously described, armature 74 raises to close seat 72 and to open seat 67, thus permitting pressure fluid in passage 94 to pass through seat 67 into armature chamber 68 and passage 95 to recess 88 to act downwardly on the second effective area of piston 85 and force the same and valve 29 downwardly.

Although two forms of the invention have been illustrated and described, it is apparent that other modifications may be made which come within the scope of the invention as defined by the claims.

We claim:

1. In combination, a housing having fluid distributing ports, a movable valve member for controlling flow of fluid through said ports, said housing having spaced large and small diameter bores therein, a piston having a small diameter end within the small bore and a large diameter end within the large bore, said piston having between its ends a driving connection with said valve member, said piston having a closed recess at its large end, a pilot valve housing having a pilot valve therein and having a cylindrical portion projecting into said recess with a sealed sliding fit therewith, said piston providing small and differential areas subject to fluid under pressure for moving the piston in one direction or another, a first passage means for constantly directing fluid under pressure to the small area, a second passage means controlled by the pilot valve for directing fluid under perssure to the large area, said second passage means leading from said first passage means and extending between said large diameter end and said large bore to the interior of said cylindrical portion and then to said pilot valve.

2. A valve comprising a main housing having a plurality of ports, a valve member for controlling flow of fluid through said ports, said housing having a large and a small diameter bore, a pilot valve housing having a cylindrical portion extending into said large bore, a piston having a small diameter and extending into said small bore and a large diameter portion extending into said large bore, one of said portions having a recess and the other of said portions extending into said recess and sealed with respect to the wall thereof by sealing means to provide a large effective area on said piston, said piston having a small effective area facing opposite to the large effective area, a passage between the main housing and said recessed portion, means including said passage for directing fluid under pressure from one of said ports to said large effective area for moving the piston in one direction, and means for exhausting the fluid from the large effective area, whereby fluid acting against said small effective area is operative to move the piston in another direction, said valve member being attached to the piston for movement therewith.

3. The valve of claim 2 in which said passage includes a clearance between said main housing and said recessed portion.

4. The valve of claim 2 in which said sealing means is unidirectional to permit flow of fluid therepast from the recess to prevent build-up of excess pressure within said recess.

5. The valve of claim 2 in which the large diameter piston portion has the recess and the bottom wall of the recess provides the large effective area.

6. The valve of claim 2 in which the recess is in the large diameter piston portion and the bottom wall of said recess is imperforate.

7. The valve of claim 2 in which the large diameter piston portion has the recess and the wall of said recess has radial openings between the open end of said recess and said sealing means forming a continuation of said passage.

8. The valve of claim 2 in which the cylindrical portion has the recess and the large effective area is provided across the entire diameter of said large diameter piston portion.

9. The valve of claim 2 in which said passage includes a slot between said housing and said recessed portion.

10. A valve comprising a main housing having a plurality of ports, a valve member for controlling flow of fluid through said ports, a pilot valve housing having a depending portion, a piston having an enlarged portion, one of said portions having a recess receiving the other portion, said recess between said portions constituting a chamber for receiving fluid under pressure to act upon said piston portion to move the piston in one direction, passage means for directing and exhausting fluid under pressure to and from said chamber, said passage means including a clearance between the outer wall of the recessed portion and the main valve housing, a pivot valve within said pilot valve housing for controlling flow of fluid through said passage means, said piston having an area subject to pressure fluid for moving the piston in another direction when pressure fluid is exhausted from said chamber, said valve member being carried by the piston for movement therewith.

References Cited in the file of this patent

UNITED STATES PATENTS

| | | |
|---|---|---|
| 2,624,585 | Churchill et al. | Jan. 6, 1953 |
| 2,761,470 | Batts | Sept. 4, 1956 |
| 2,898,936 | Collins | Aug. 11, 1959 |
| 2,916,051 | Taylor | Dec. 8, 1959 |
| 2,949,131 | Collins | Aug. 16, 1960 |
| 2,977,984 | Barnes | Apr. 4, 1961 |